United States Patent
Hudson

(10) Patent No.: US 6,736,542 B2
(45) Date of Patent: May 18, 2004

(54) REDUCED WIDTH TILTING PAD JOURNAL BEARING AND RELATED METHOD

(76) Inventor: James Hudson, 1216 E. Shade Tree La., Appleton, WI (US) 54915

( * ) Notice: Subject to any disclaimer, the term of this patent is extended or adjusted under 35 U.S.C. 154(b) by 0 days.

(21) Appl. No.: 10/064,773

(22) Filed: Aug. 15, 2002

(65) Prior Publication Data

US 2004/0032996 A1 Feb. 19, 2004

(51) Int. Cl.[7] .............................................. F16C 17/03
(52) U.S. Cl. ....................................................... 384/117
(58) Field of Search ................................ 384/117, 309, 384/310, 311, 312

(56) References Cited

U.S. PATENT DOCUMENTS

| | | |
|---|---|---|
| 3,994,541 A * | 11/1976 | Geary et al. ................. 384/117 |
| 4,381,128 A | 4/1983 | Vohr |
| 4,497,587 A | 2/1985 | Pine |
| 4,525,083 A | 6/1985 | Pedersen |
| 4,533,262 A | 8/1985 | Pedersen |
| 4,597,676 A | 7/1986 | Vohr et al. |
| 5,423,613 A | 6/1995 | Keck et al. |

* cited by examiner

Primary Examiner—Lenard A. Footland

(57) ABSTRACT

A bearing pad for a tilt pad journal bearing assembly includes a pad body having a concave journal surface on one side and a mounting portion on an opposite side adapted to secure the pad to a bearing casing, the journal surface having undercut surfaces extending along opposite marginal edges thereof in a lengthwise dimension of the pad.

6 Claims, 3 Drawing Sheets

REDUCED WIDTH TILTING PAD JOURNAL BEARING AND RELATED METHOD

BACKGROUND OF INVENTION

The present invention relates to bearings for rotary machines and, specifically, to a tilt pad journal bearing assembly having reduced width bearing pads.

Tilt pad bearings are commonly used in large, high speed, rotating machinery such as gas and steam turbines and high speed compressors. For example, tilt pad bearings used for a turbine rotor provide the only practical means by which vibrations in the journal may be damped. Although most applications of the tilt pad bearing are generally successful, it is recognized that, in some situations, the tilt pad bearing's capacity for vibration damping is less than desired.

Typically, the bearing assembly is arranged concentrically about the journal of, for example, a compressor rotor, and include a plurality of arc segments, or tilt pads that are retained within a casing that is also concentric with the journal. Each tilt pad has a pad body with an inner bearing or journal engaging surface (or, simply, journal surface) which is closely concentric to the cylindrical surface of the journal, and an outer surface that includes a pad mounting component that allows the pad to self-center on the journal. The journal surface itself is continuous and smooth over the entirety thereof.

Problems have been experienced with bearing pads of the above described type in certain high speed compressors. Specifically, a problem with synchronous instability known in the literature as the "Morton Effect" has been experienced in high speed single stage compressors running at approximately 10,500 rpm. This so-called Morton Effect is characterized by continuously rising vibrations at constant (for example, rated) speed.

SUMMARY OF INVENTION

In the exemplary embodiment of this invention, the width of each tilt pad journal surface is reduced from either side by relieving the marginal edges of the pad to form marginal undercut surfaces or lands. The journal surface width may thus be reduced by about 50%, thereby increasing the unit loading on the journal surface. It was discovered unexpectedly that this modification also reduces vibration and eliminates the synchronous instability problem in certain high speed compressors. In the exemplary embodiment, the extent of the relief or undercut is approximately 0.050 inch.

Accordingly, in one aspect, the present invention relates to a bearing pad for a tilt pad journal bearing assembly comprises a pad body having a concave journal surface on one side and a mounting portion on an opposite side adapted to secure the pad to a bearing casing, the journal surface having undercut surfaces extending along opposite marginal edges thereof.

In another aspect, the invention relates to a bearing pad for a tilt pad journal bearing assembly comprises a pad body having a concave journal surface on one side and a mounting portion on an opposite side adapted to secure the pad to a bearing casing, the journal surface having undercut surfaces extending along opposite marginal edges thereof.

In still another embodiment, the invention relates to a method of reducing vibration in a tilt pad journal bearing assembly having a casing and a plurality of bearing pads mounted in the casing, the method comprising a) providing individual arcuate tilt pads having concave journal surfaces; and b) forming relieved surfaces on either side of the journal surface along marginal edges thereof in an arcuate length dimension.

The invention will now be described in greater detail in conjunction with the following drawing figures.

DETAILED DESCRIPTION

Figure 1:
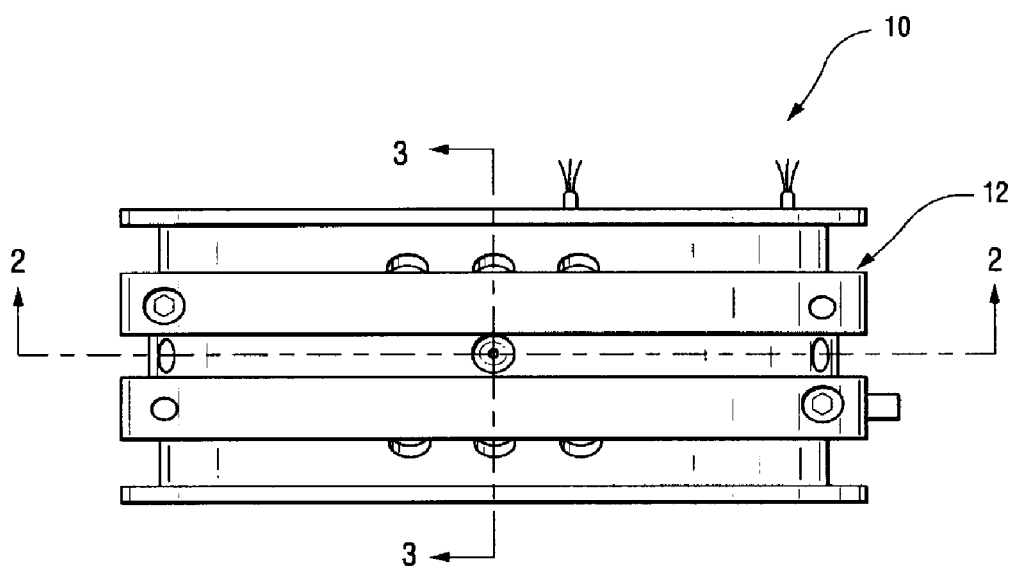
FIG. 1 is a side elevation of a tilt pad journal assembly in accordance with the invention.
Figure 2:
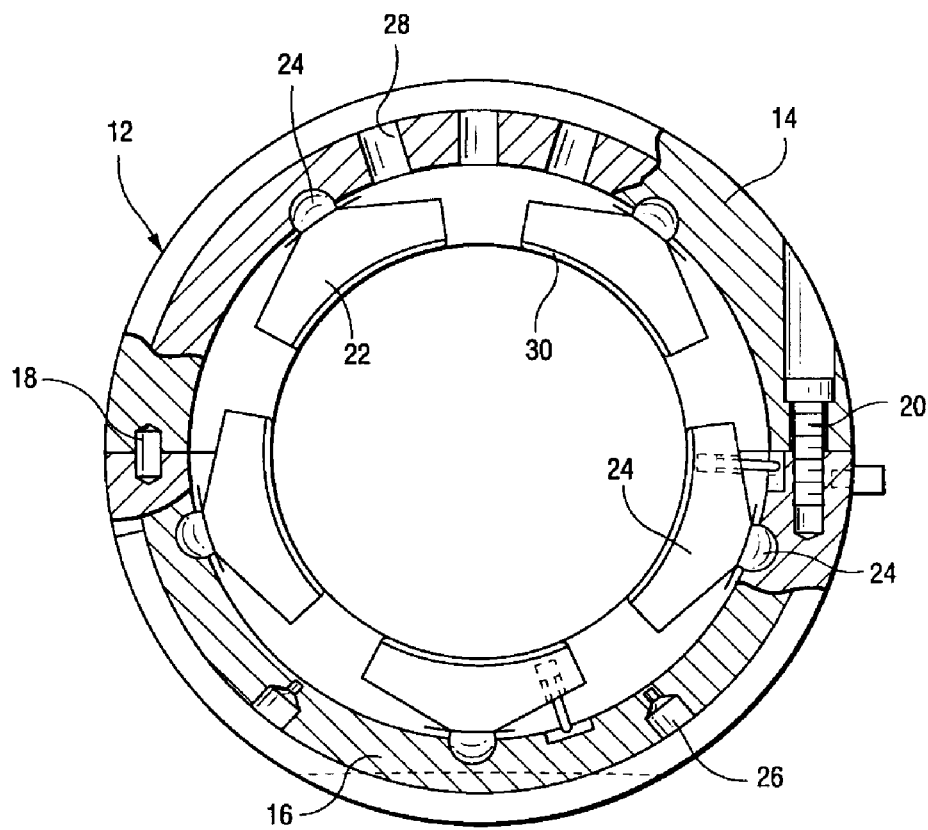
FIG. 2 is a section taken along the line 2—2 of FIG. 1.
Figure 3:
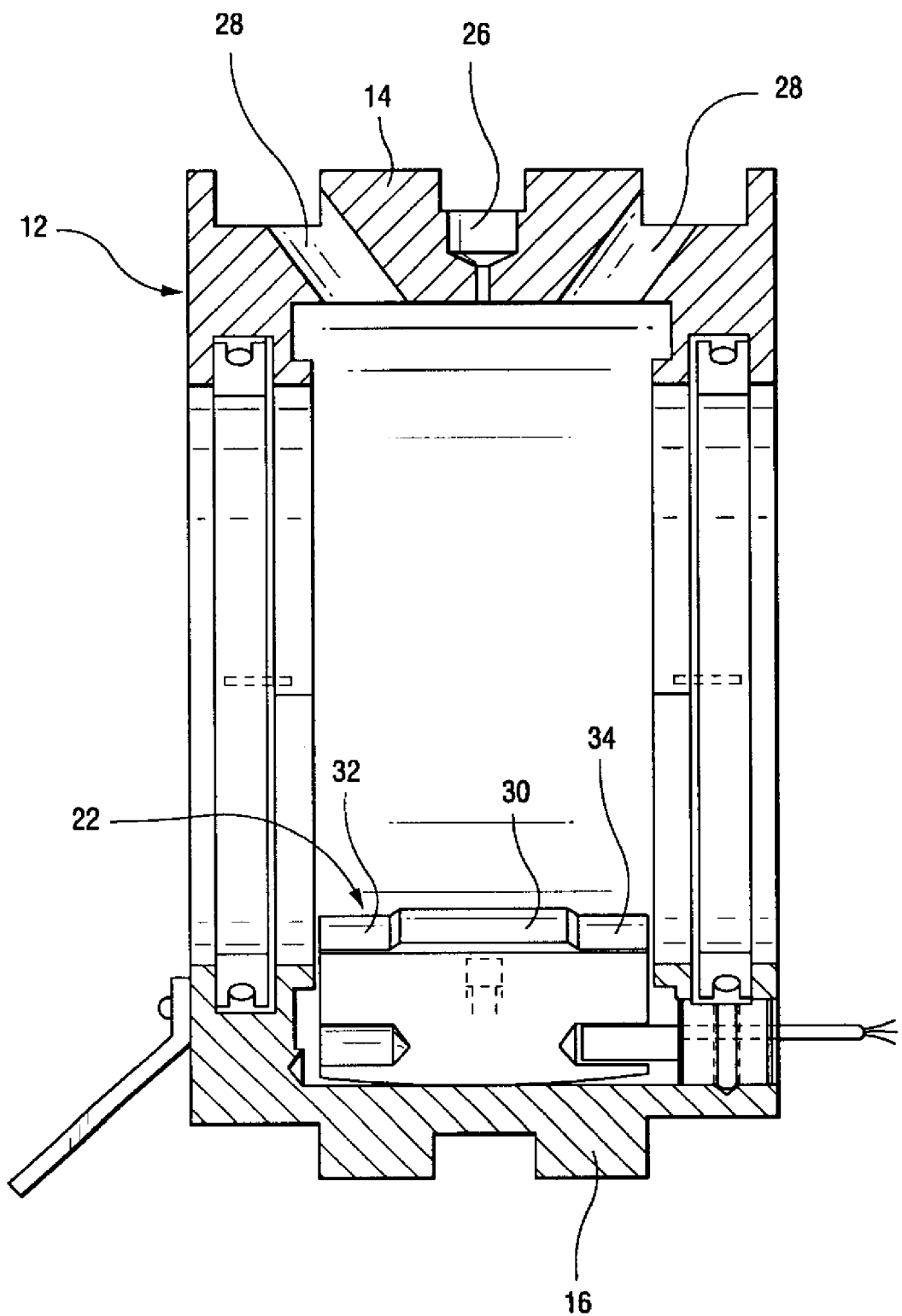
FIG. 3 is a section taken along the line 3—3 of FIG. 1.

With reference to FIGS. 1–3, a tilt bearing pad journal assembly 10 includes a casing 12 that is constructed in two semi-circular sections 14, 16 joined along a horizontal centerline by one or more alignment pins 18 and one or more assembly bolts 20. Within the interior of the casing, there are a plurality of arcuate tilt pads 22 (five in the embodiment shown) that are arranged concentrically with respect to a journal (schematically shown in FIG. 2 at 31) of a rotating machine such as a high speed compressor. Each bearing pad 22 includes a pad body with a swivel mount 24 (or other suitable mounting arrangement) on the back side of the body that secures the pads to the casing and allows the bearing pads to self-center on the surface of the journal.

A plurality of fluid inlet holes 26 are provided about the casing for supplying lubricating liquid to the area in and around the bearing pads 22, and a plurality of outlet holes 28 are also provided in the casing for permitting the lubricant to exit the casing in a flow-through type arrangement.

Each bearing pad 22 has a concave journal facing surface 30 on its front side, with the curvature of surface 30 designed to match closely the curvature of the journal 31. In prior bearing pad designs, the journal surface has been continuous and smooth along the entire width of the pad.

Figure 4:
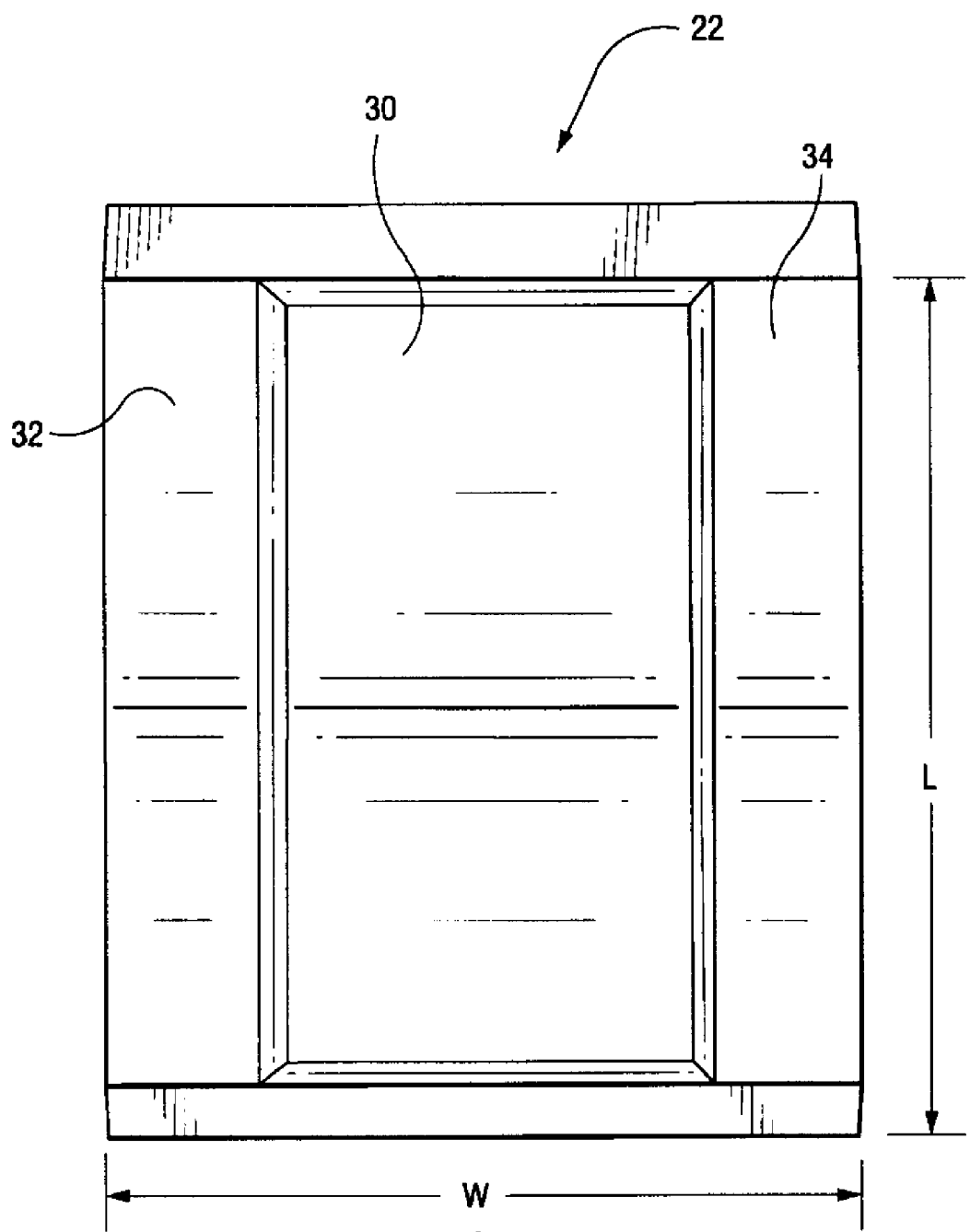
FIG. 4 is an enlarged plan view of a single bearing pad in accordance with the exemplary embodiment of the invention.

FIG. 4 shows an enlarged view of a single pad 22 in isolation. The pad 22 has an arcuate length L and a width W. The journal facing surface 30 on the front side of the pad body has been reduced in width by machining undercut surfaces or lands 32, 34 along opposite marginal edges of the pad, in a lengthwise (i.e., circumferential) direction of the pad. Note that, as shown in FIG. 3, the undercut surfaces or lands 32, 34 remain exposed to the journal.

In one example, the bearing pad has a width of 2.375 inches. The reduced width pad in accordance with this invention is achieved by trimming 0.562 inch along opposite marginal edges of the pad, leaving a remaining journal engaging surface 33 having a width of approximately 1.25 inches. The effective journal engaging surface is thus reduced by just over 50%. Stated differently, the combined width of the marginal undercut surfaces 32, 34 is also about 50% of the journal facing surface 30. The depth of the relieved undercut surfaces or lands 32, 34 is approximately 0.050 inch on a side. For other specific applications, the effective pad width dimension, and hence the width of the relieved undercut surface dimensions, as well as the depth of the undercut surfaces, may be varied as required.

The reduced width tilt pad as described above has been shown to increase damping and substantially reduce synchronous vibration levels in certain single stage high speed compressors, but it will be understood that the invention has applicability to other rotary machines as well.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A bearing pad for a tilt pad journal bearing assembly comprises a pad body having a concave journal facing surface on one side and a mounting portion on an opposite side adapted to secure the pad to a bearing casing, said journal surface having exposed undercut surfaces extending along opposite marginal edges thereof; and wherein said undercut surfaces have a combined width of about 50% of the journal facing surface.

2. A bearing pad for a tilt pad journal bearing assembly comprises a pad body having a concave journal facing surface on one side and a mounting portion on an opposite side adapted to secure the pad to a bearing casing, said journal surface having exposed undercut surfaces extending along opposite marginal edges thereof; wherein said undercut surfaces are recessed about 0.050 inch from a remainder of said journal facing surface.

3. A tilt pad bearing assembly for a journal comprising a casing and a plurality of bearing pads mounted in said casing, each bearing pad having a concave journal facing surface with undercut surfaces extending along opposite marginal edges of said journal facing surface, said casing configured to leave said undercut surfaces fully exposed to the journal.

4. A tilt pad bearing assembly comprising a casing and a plurality of bearing pads mounted in said casing, each bearing pad having a concave journal facing surface with exposed undercut surfaces extending along opposite marginal edges of said journal facing surface; wherein said undercut surfaces are recessed about 0.050 inch from a remainder of said journal facing surface.

5. The tilt pad bearing assembly of claim 4 wherein said undercut surfaces have a combined width of about 50% of the journal facing surface.

6. A tilt pad bearing assembly comprising a casing and a plurality of bearing pads mounted in said casing, each bearing pad having a concave journal facing surface with exposed undercut surfaces extending along opposite marginal edges of said journal facing surface; wherein said undercut surfaces have a combined width of about 50% of the journal facing surface.

* * * * *